(12) United States Patent
Goyal et al.

(10) Patent No.: US 8,630,190 B2
(45) Date of Patent: Jan. 14, 2014

(54) METHOD AND SYSTEM TO IDENTIFY A NETWORK DEVICE ASSOCIATED WITH POOR QOS

(75) Inventors: Dinesh Goyal, Milpitas, CA (US); Sachin Purushottam Saswade, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 567 days.

(21) Appl. No.: 11/466,390

(22) Filed: Aug. 22, 2006

(65) Prior Publication Data

US 2008/0049634 A1    Feb. 28, 2008

(51) Int. Cl.
*H04L 12/28*   (2006.01)

(52) U.S. Cl.
USPC ........................ 370/252; 370/230; 370/236

(58) Field of Classification Search
USPC ......... 370/252, 248, 254, 389, 516, 519, 517; 379/26.01; 375/213; 709/224, 238
See application file for complete search history.

(56) References Cited

U.S. PATENT DOCUMENTS

| | | | |
|---|---|---|---|
| 6,269,398 B1 * | 7/2001 | Leong et al. | 709/224 |
| 6,868,068 B1 * | 3/2005 | Jain et al. | 370/252 |
| 6,970,924 B1 * | 11/2005 | Chu et al. | 709/224 |
| 7,428,300 B1 * | 9/2008 | Drew et al. | 379/29.09 |
| 2003/0091033 A1 * | 5/2003 | Van den Boeck et al. | 370/352 |
| 2004/0073641 A1 * | 4/2004 | Minhazuddin et al. | 709/223 |
| 2005/0198266 A1 * | 9/2005 | Cole et al. | 709/224 |
| 2005/0281204 A1 * | 12/2005 | Karol et al. | 370/248 |
| 2006/0184670 A1 * | 8/2006 | Beeson et al. | 709/224 |
| 2006/0250967 A1 * | 11/2006 | Miller et al. | 370/241 |
| 2007/0097966 A1 * | 5/2007 | Scoggins et al. | 370/389 |
| 2007/0101020 A1 * | 5/2007 | Lin et al. | 709/238 |
| 2007/0168195 A1 * | 7/2007 | Wilkin et al. | 704/270 |

* cited by examiner

*Primary Examiner* — Yemane Mesfin
*Assistant Examiner* — Samina Choudhry
(74) *Attorney, Agent, or Firm* — Schwegman Lundberg & Woessner, P.A.

(57) ABSTRACT

A method and apparatus to analyze real-time data transmissions across a network is described. The method may comprise transmitting a sample data stream between source and destination endpoints across a test data path which includes network devices. The method may then compare a measured quality of the received sample data stream with pre-defined quality criteria associated with the network. If the measured quality fails to meet the pre-defined quality criteria, the network devices in the test data path may be identified, device performance data may be obtained, and a network report may be generated based on the device performance data. The device performance data may comprise processor utilization, memory utilization, bandwidth over subscription, buffer over run, and/or a number of non-error packets that are discarded at the network device.

40 Claims, 5 Drawing Sheets

| MOS | QUALITY | IMPAIRMENT |
|---|---|---|
| 5 | EXCELLENT | IMPERCEPTIBLE |
| 4 | GOOD | PERCEPTIBLE BUT NOT ANNOYING |
| 3 | FAIR | SLIGHTLY ANNOYING |
| 2 | POOR | ANNOYING |
| 1 | BAD | VERY ANNOYING |

| STANDARD CODECS | ALGORITHM | EXPECTED MOS |
|---|---|---|
| G.711 | PCM | 4.10 |
| G.726, G.727 | ADPCM | 3.85 |
| G.722 | DB-ADPCM | 3.3 |
| G.728 | LD-CELP | 3.61 |
| G.729 | CS-ACELP | 3.92 |
| G.729A | CS-ACELP | 3.7 |
| G.723.1 | PMC-MLQ | 3.9 |
| GSM 06.10 | RPE-LTP | 3.5 |
| IS-54 | VSELP | 3.54 |
| FS-1016 | CELP | 3.0 |
| FS-1015 | LPC10E | 2.4 |

METHOD AND SYSTEM TO IDENTIFY A NETWORK DEVICE ASSOCIATED WITH POOR QOS

FIELD

This application relates generally to computer network communications, and particularly to a method of and system for identifying a particular network device which contributes to poor quality of service of real-time data transmission across a network.

BACKGROUND

Popularity of IP (Internet Protocol) telephony (e.g. VoIP, video calls, etc) is increasing, and deployments of IP Telephony are correspondingly increasing in terms of number of subscribers and size of networks. The increasing number of subscribers using IP telephony for their day to day communication places increased load on network infrastructure, which leads to poorer voice quality owing to inadequate capacity or faulty infrastructure.

IP telephony places strict requirements on IP packet loss, packet delay, and delay variation (or jitter). In multi-site complex customer networks, there may be many WAN edge routers that interconnect many branches of an enterprise or of many small businesses managed by a service provider.

Probable causes of poor voice quality at the WAN edge router are Codec conversions, mismatched link speeds, and bandwidth oversubscription owing to number of users, number of links, and/or link speed. Each of these causes results in buffer overruns, leading to packet discards, which in turn degrades the quality of voice or service.

BRIEF DESCRIPTION OF DRAWINGS

The present invention is illustrated by way of example and not limitation in the figures of the accompanying drawings, in which like references indicate similar elements and in which:

FIG. 2b shows a network which includes the computer system of FIG. 2a.

DETAILED DESCRIPTION

In the following description, for purposes of explanation, numerous specific details are set forth in order to provide a thorough understanding of an embodiment of the present invention. It will be evident, however, to one skilled in the art that the present invention may be practiced without these specific details.

Figure 1:
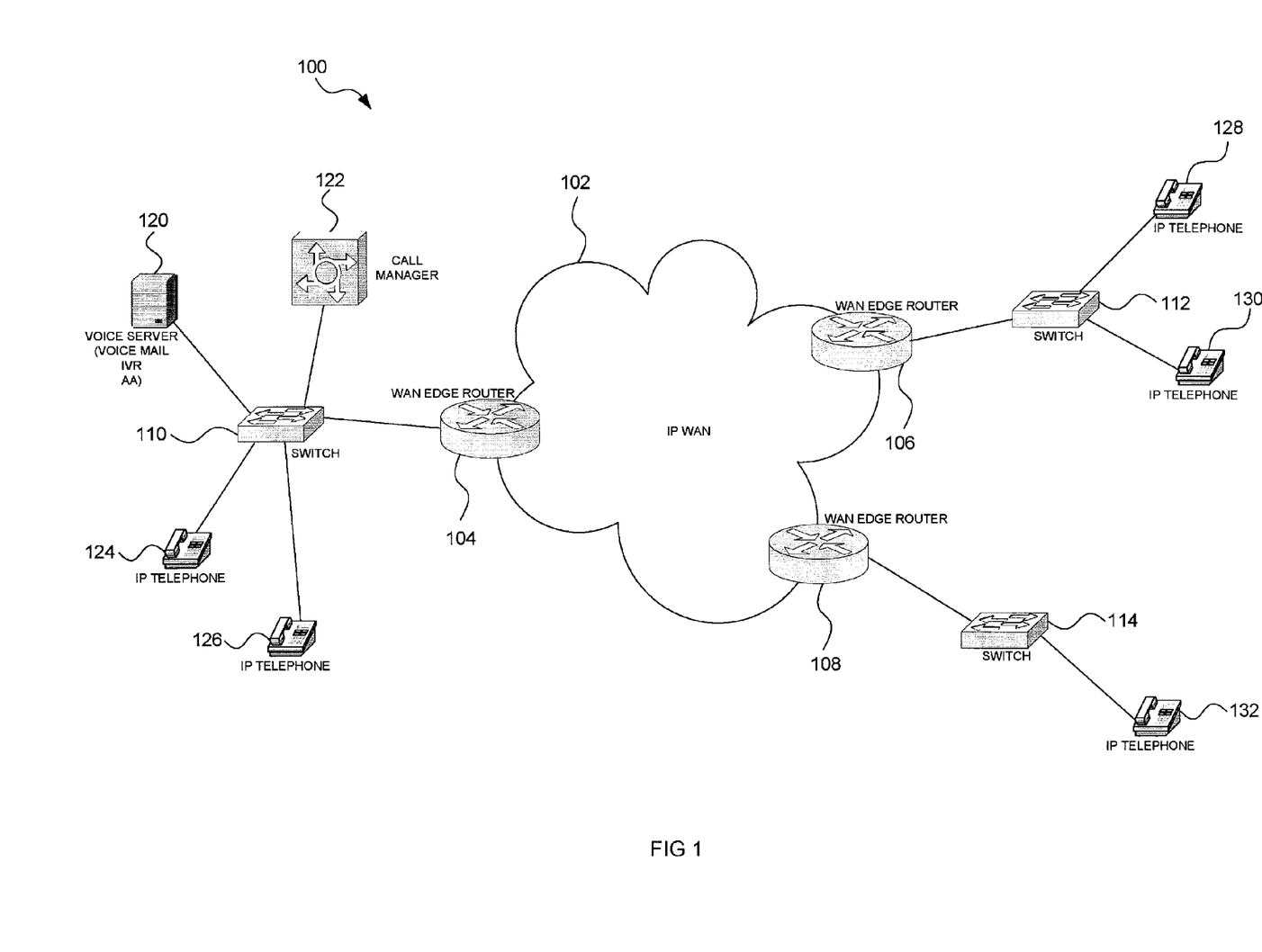
FIG. 1 is a schematic representation of a system comprising a WAN in accordance with an example embodiment.

FIG. 1 shows a system 100 to identify a particular network device which contributes to poor quality of service of real-time data transmission across a network, in accordance with an example embodiment. The system 100 includes a network, shown by way of example as an IP WAN 102, which includes a plurality of network devices, e.g. routers. Some routers (not shown) form the backbone of the WAN 102, while other routers 104 to 108 are arranged at the edge of the WAN 102 and are therefore WAN edge routers. Each WAN edge router 104 to 108 may connect a plurality of miscellaneous network devices and/or computer systems to the WAN 102. In this example embodiment, however, the WAN edge routers 104 to 108 are connected to the respective switches 110 to 114. The routers 104 to 108 and switches 110 to 114 are examples of level 3 (L3) network devices.

A plurality of IP telephones 124 to 132 are connected via the switches 110 to 114 and routers 104 to 108 to the WAN 102. The IP telephones 124 to 132 may be fixed or mobile telephones, e.g. VoIP telephones. In addition, the system 100 may include a voice application server 120, such as a voice-mail system, IVR (Interactive Voice Response) system, or the like, and also includes a computer system in the form of a call manager 122, in accordance with an example embodiment. It should however be noted that the example embodiments are not limited to voice only transmission but also extend to any real-time (or time critical communications) such as video.

It is to be understood that the example IP telephones 124 to 132 communicate with one another and/or with other telephones by digitising voice or other sound (or even video with video telephones) and by sending the voice data in a stream of IP packets across the WAN 102 or other network. It is important for networks carrying voice streams to provide a high quality of service (QoS) so that the voice is clear or at least audible when received by a receiver telephone. Thus, packet loss or delay is undesirable as it lowers the QoS. This is not necessarily a problem with conventional data packet transmission, e.g., with non-voice or non real-time data, as dropped packets can be retransmitted and delayed packets reassembled in due course.

Figure 2A:
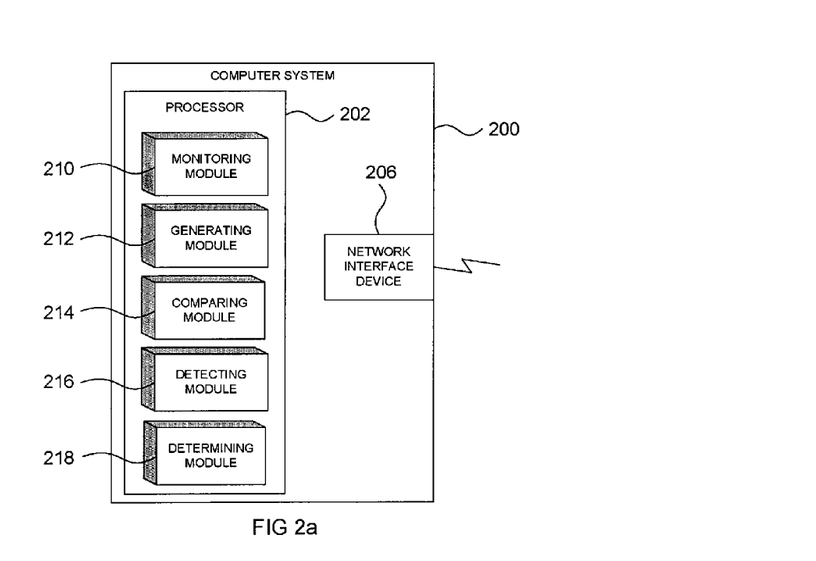
FIG. 2a is a schematic representation of a computer system in accordance with an example embodiment.

FIG. 2a shows an example embodiment of a computer system 200 (e.g., a computer server) for implementing the methodology described herein. In an example embodiment, the computer system 200 may be configured as the Call Manager 122 of FIG. 1. Thus, the computer system 200 may act as a call processing agent. However, it should be noted that the computer system 200 may also form part of (e.g., embedded within) a telephony endpoint such as an IP telephone.

The computer system 200 includes a processor 202 and a network interface device 206 (e.g. a network card) for communication with a network. The processor 202 comprises a plurality of conceptual modules, which corresponded to functional tasks performed by the processor 202. To this end, the computer system 200 may include a machine-readable medium, e.g. the processor 202, main memory, and/or a hard disk drive, which carries a set of instructions to direct the operation of the processor 202, for example being in the form of a computer program. More specifically, the processor 202 is shown by way of example to include: a monitoring module 210 to monitor network devices connected to the system 200; a generating module 212 to generate a sample real-time data stream; a comparing module 214 to compare quality of the sample real-time data stream with pre-defined quality criteria; a detecting module 216 to detect network devices in a network of which the system 200 forms part; and a determining module 218 to determine whether or not any detected network devices are contributing to a poor QoS. It is to be understood that the processor 202 may be one or more microprocessors, controllers, or any other suitable computing device, resource, hardware, software, or embedded logic. Furthermore, the functional modules 210 to 218 may distributed among several processors, or alternatively may be consolidated within a single processor, as shown in FIG. 2a.

It is important to note that the computer system 200 need not include all the modules 210 to 218. Accordingly, some of the conceptual modules 210 to 218 may also be distributed across different network devices. For example, in an example embodiment, the monitoring module 210, the detecting module 216, the determining module 218, and a reporting module may be provided in a network management system. Further, in an example embodiment, the generating module 212 and the detecting module 216 may be provided in a call agent. It should also be noted that the multiple module (e.g., duplicate modules) may also be provided in different devices across the network.

The monitoring module 210 monitors L3 network devices in a network to which the computer system 200 is connected. The monitoring module 210 is configured to poll or interrogate the network devices intermittently, e.g. at pre-defined monitoring intervals, to determine performance data or statistics for at least one but preferably for all interfaces on the network devices. The monitoring module 210 is particularly configured to monitor performance statistics for network routers. The performance statistics which are monitored include processor utilisation and memory utilisation of each monitored network device, for example expressing the memory utilisation of each device as a percentage of maximum memory utilisation. The monitoring module 210 may further monitor non-error IP packets which are dropped or discarded, e.g. also in the form of a percentage. The monitoring module 210 may thus, for instance, record that 10% of non-error data packets are being dropped by a particular network device (e.g., due to buffer overruns).

These performance statistics which are monitored provide an indication of whether or not the particular network device, such as router 104 to 108, is coping satisfactorily with traffic on each of its interfaces, e.g. ATM (Asynchronous Transfer Mode) interface, T1 interface, etc. The traffic statistics may be temporarily stored for later use, e.g. on a memory module connected to the computer system 200.

The generating module 212 may be operable to generate and send a sample real-time data stream (e.g., a known voice clip) to a remote network device or other computer system. The sample real-time data stream may be of a known quality, so that quality degradation can be measured. It is to be appreciated that the generating module 212 may be remote from the other modules, e.g. hosted by a router or switch. The sample stream is transmitted between two endpoints, namely a source endpoint and a destination endpoint (which may be randomly selected). The generating module 212 may serve as the source endpoint, while the destination endpoint may be a remote computer system, e.g. a router or switch. One or more network devices (e.g. WAN edge routers 104 to 108) are in the path of the sample stream, so that the quality of the data stream after transmission is influenced by the networks device(s). In other embodiments, the generating module 212 can be located on a system separate from the computer system 200, the computer system 200 optionally serving as a destination endpoint.

The comparing module 214 may compare quality of the sample real-time data stream after transmission with pre-defined quality criteria which, for example, include impairment factors such as Codec type, network topology, etc. The quality of the sample stream after transmission may be measured by a measuring module (refer further to FIG. 2b) which need not form part of the computer system 200. If the quality of the sample real-time data stream after transmission is lower than an expected quality based on the impairment factors, the detecting module 216 may detect which network devices (particularly L3 network devices, e.g. routers and switches) in the transmission path of the sample stream are potentially contributing to a low QoS.

The determining module 218 then determines whether or not any of the detected network devices in the sample stream path are over-loaded or are performing poorly based on the performance statistics gathered by the monitoring module 210.

Figure 2B:
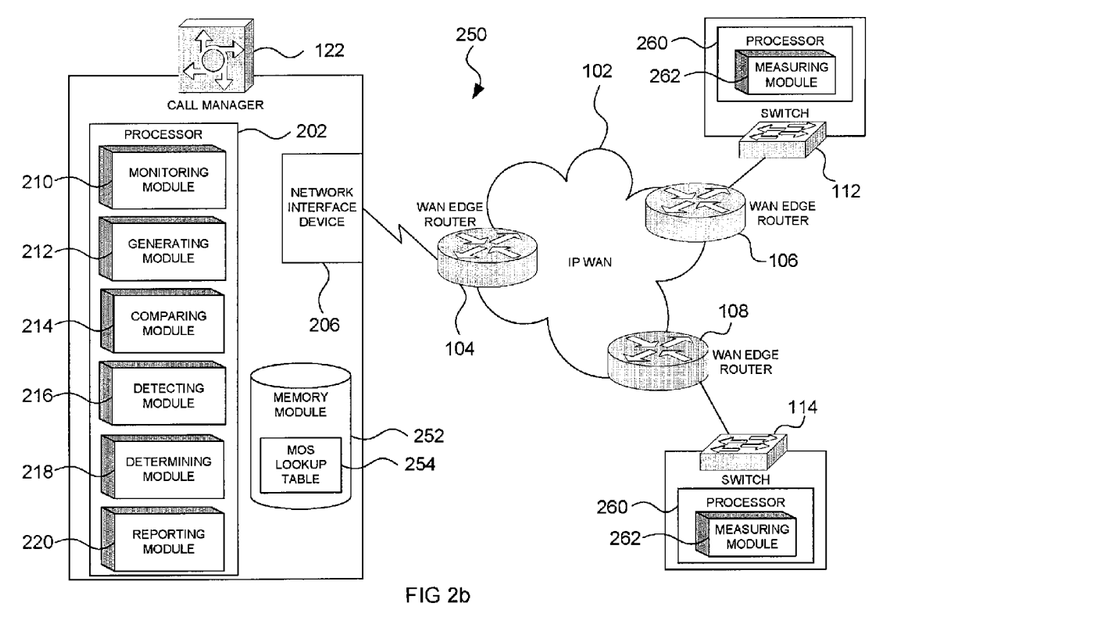

Referring now to FIG. 2b, a system 250 is shown in accordance with an example embodiment. In this example embodiment, the call manager 122 provides the computer system 200 illustrated generally in FIG. 2a. In addition to modules 210 to 218, the call manager 122 also includes a reporting module 220 to generate a report or an alert regarding network devices which may be contributing to a low QoS. In an example embodiment, the system 250 includes a switch 112 which comprises a processor 260 having a measuring module 262 thereon. The measuring module 262 is configured for receiving a sample stream from the generating module 212, and for measuring the quality of the sample stream after transmission. The measuring module 262 may be configured to transmit the measured sample stream quality back to the call manager 122. To perform the measuring, the measuring module 262 may use any appropriate method or algorithm, for example the MOS estimation algorithm. In this regard, the call manager 122 may include a memory module 252, e.g. a hard disk drive, having stored thereon an MOS lookup table 254 which comprises a plurality of pre-defined expected MOS values for associated impairment factors—Codec types, in this example.

Figure 3A:
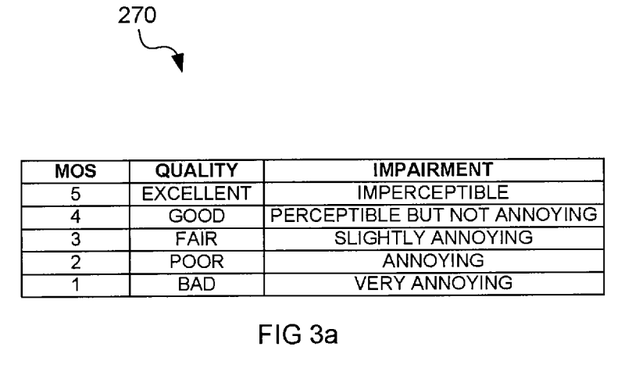
FIG. 3a shows a table of MOS scores with their associated qualities.
Figure 3B:
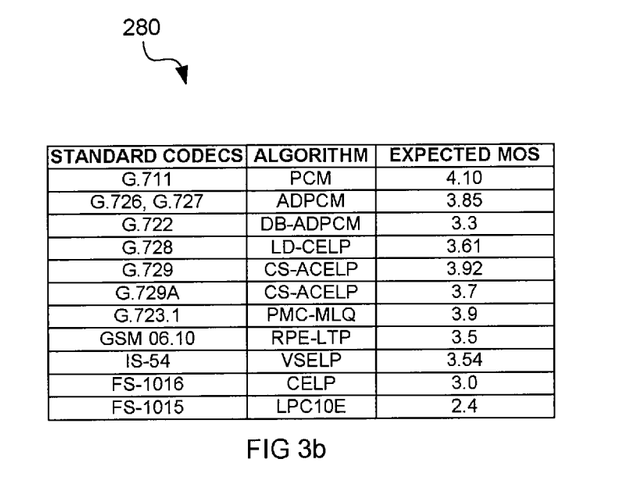
FIG. 3b shows a table of expected MOS values based on impairment factors.

FIG. 3a shows a table 270 of MOS values with their associated qualities, and is illustrated merely to give an indication of the range of MOS values, while FIG. 3b shows a table 280 of expected MOS values based on impairment factors, which in this example embodiment include a Codec type. However, it is to be understood that the Codec type is often matched to a particular network topology, and that selection of a particular Codec from table 280 may thus automatically take into account a network topology as an impairment factor.

Figure 4A:
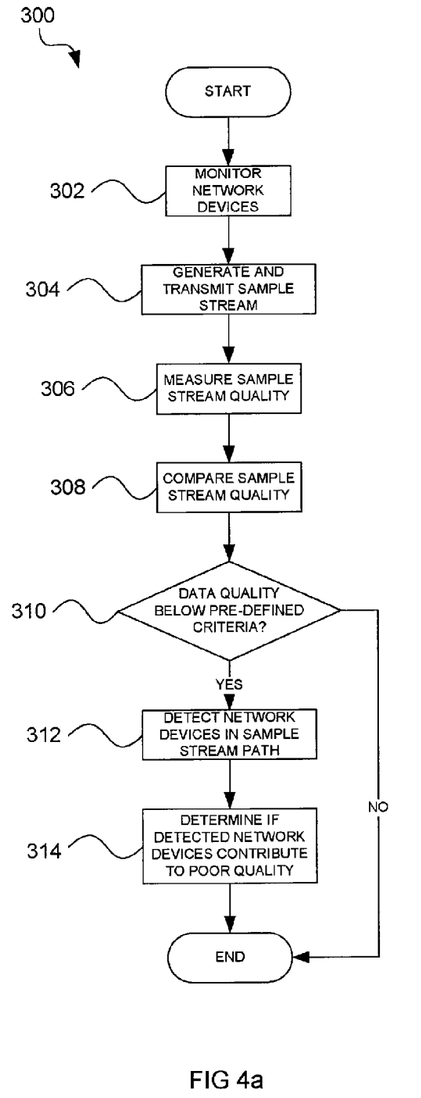
FIGS. 4a and 4b show flow diagrams of methods, in accordance with example embodiments, to identify a network device contributing to a poor QoS in a real-time data network.
Figure 4B:
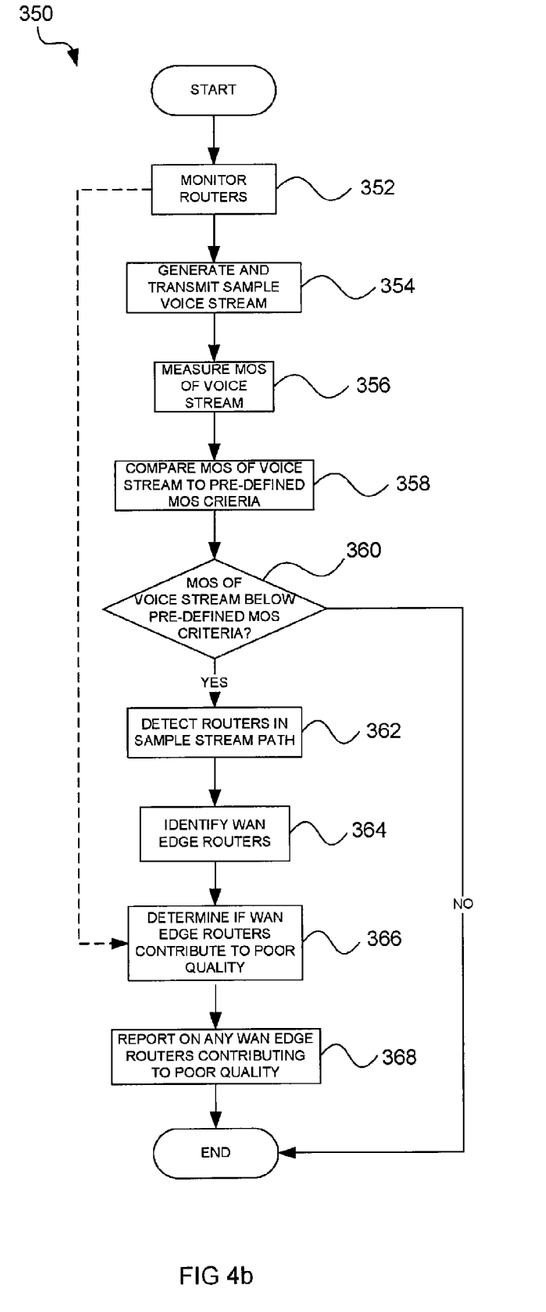

An example embodiment is further described in use with reference to FIGS. 4a and 4b. FIG. 4a shows a high-level flow diagram of a method 300, in accordance as an example embodiment, for identifying a network device adversely affecting the communication of real-time data (e.g., communicated using (Real-time Transmission Protocol (RTP)). Network devices in a network are monitored, at block 302, using for example the monitoring module 210. The monitoring of the network devices may include intermittently polling or interrogating the network devices to gather performance statistics (e.g., data about hardware components of the network device such as buffer overruns) for each respective network device. The monitoring of the network devices may be done repetitively at predefined monitoring intervals. Also at predefined intervals (or at any time a network test is run), a sample real-time data stream (e.g., a known voice clip) is generated and transmitted, at block 304, by the generating module 212 (the generating module 212 therefore acting as a source endpoint), to one or more destination endpoints. At the destination endpoint, the quality of the sample real-time data stream is measured, at block 306, for example, using the associated measuring module 262. The quality of the sample stream after transmission through the network is compared with the quality of the sample stream before transmission (which may be perfect or undistorted), to measure the extent to which the quality of the sample stream has been degraded or reduced. The comparing module 214 compares, at block 308, the quality of the sample stream against predefined quality criteria. If the quality of the sample stream after transmission violates, at block 310, the quality criteria, e.g. if the quality is lower than predefined minimum criteria, the detecting module 216 detects or establishes the particular network devices which are in the path of the sample stream (e.g., using RTP traceroute functionality). Based on the monitored traffic statistics gathered at block 302, the determining module 218 determines, at block 314, whether or not any of the detected network devices in the network path traversed by the sample stream (the sample stream path) are contributing to poor quality of service of the sample stream.

Referring to FIG. 4B, a flow diagram of a method 350, in accordance with an example embodiment, for identifying a network device adversely affecting the communication of real-time data is shown. The call manager 122 (e.g., utilizing the monitoring module 210) may monitor, at block 352, routers connected to the WAN 102. Depending on the configuration of the monitoring module 210, all routers connected to the WAN 102 may be monitored, or instead only the WAN edge routers 104 to 108 may be monitored. The WAN edge routers 104 to 108 may cause bottlenecks which may lead to a low quality of service. However, in certain circumstances other routers may also contribute to the low quality of service. The performance statistics (e.g., router operating data) which are thus gathered by the monitoring module 210 may be temporarily stored by the call manager 122, for example on the memory module 252.

Although the call manager 122 may be used for measuring the quality of any real-time data stream, the example embodiment may find particular application in measuring the quality of sound or voice streams, for example voice streams used for IP telephony. Thus, at block 354, the generating module 212 may generate a sample voice stream of known quality (e.g. having a MOS of 5), and may transmit the sample voice stream to a destination endpoint, for example switch 112. It will be noted that in the given example, because the call manager 122 is the source endpoint and the switch 112 is the destination endpoint, WAN edge routers 104 and 106 both lie in the path of the sample voice stream. Thus, the quality of the sample stream as received by switch 112 will be affected by the performance of WAN edge routers 104 to 106. In addition, the generating module 212 may transmit the sample voice stream to other destination endpoints, for example switch 114, to gauge the performance of WAN edge router 108. Thus, there may be a plurality of destination endpoints in the system 250 so that the sample voice streams pass through as many WAN edge routers as possible.

In another example embodiment, one of the WAN edge routers 104 to 106 may be the destination endpoint. Instead of, or in addition to, the call manager 122 may be a destination endpoint, and a router or switch may be a source endpoint. In such a case, the call manager 122 may include the measuring module 262, and the router or switch used as the source endpoint may include the generating module 212. Thus, there may be a plurality of source endpoints, and a single destination endpoint.

The measuring module 262 of switch 112 may measure, at block 356, the quality of the received sample voice stream in accordance with the MOS estimation algorithm, and transmit data indicative of the measured voice quality back to the call manager 122. The comparing module 214 may thereafter compare, at block 358, the measured value of the sample voice stream against an expected quality value. For example, the comparing module 214 may determine what quality value is to be expected based on the network topology and/or all the Codecs used for transmitting the sample voice stream. The comparing module 214, using impairment factors, may thus determine an expected quality of the sample voice signal after transmission. For example, if the sample voice stream was transmitted using the G.711 Codec, the expected MOS is 4.10 (refer to table 280 of FIG. 3a). The MOS lookup table may therefore be similar or identical to table 280. Therefore, if the quality of the sample voice signal as measured by the measuring module 262 is less then 4.10, at block 360, the quality of the sample voice stream is lower than expected for the particular network configuration and Codec, and the call manager 122 may then be configured to detect, at block 362, all routers in the path of the sample voice stream, for example by using the RTP traceroute command. In the example system 250, the WAN edge routers 104 to 106 are in the path of the sample voice stream. There may of course be other routers (not shown) in the path as well, these other routers forming part of the WAN 102 backbone. The detecting module 216 may in such a case be configured to identify, at block 364, which of the detected routers are WAN edge routers. As previously mentioned, it may be the WAN edge routers which cause a bottleneck and therefore contribute to a poor quality of service.

Using the traffic statistics gathered at block 352 by the monitoring module 210, the determining module 218 may then determine, at block 366, which of the detected WAN edge routers 104 to 106 in the sample stream path, if any, are contributing to the poor quality of service, and more specifically, which of these routers' interfaces are contributing to a poor quality of service. For example, if the traffic statistics show that an ATM interface of WAN edge router 104 had (and/or has) a very high memory or CPU usage (for example 80% to 100%) or was (and/or is) discarding an unusually high amount of non-error packets (e.g. one in 10 non-error packets were (and/or are) being discarded) it is likely or at least possible that the ATM interface of WAN edge router 104 is contributing to a poor quality of service.

It is to be understood that the order of some of the steps/operations described above may be changed and the same result may still be achieved. For example, the step of monitoring the routers, at block 352, may be performed later in the process, for example before or after the quality of the sample voice stream is measured at block 356, or before or after the WAN edge routers 104 to 108 are identified, at block 364.

The reporting module 226 may generate a report (e.g. in the form of a dashboard), at block 368, which summarizes the performance of each interface of each of the identified potentially faulty WAN edge routers 104 to 106 insofar as it relates to transmission quality of real-time data such as voice streams. The network administrator, after seeing the report, may be in a better position to correct the problem, for example by adjusting or bypassing the WAN edge router 104 to 108 which is causing the low quality of service.

Figure 5:
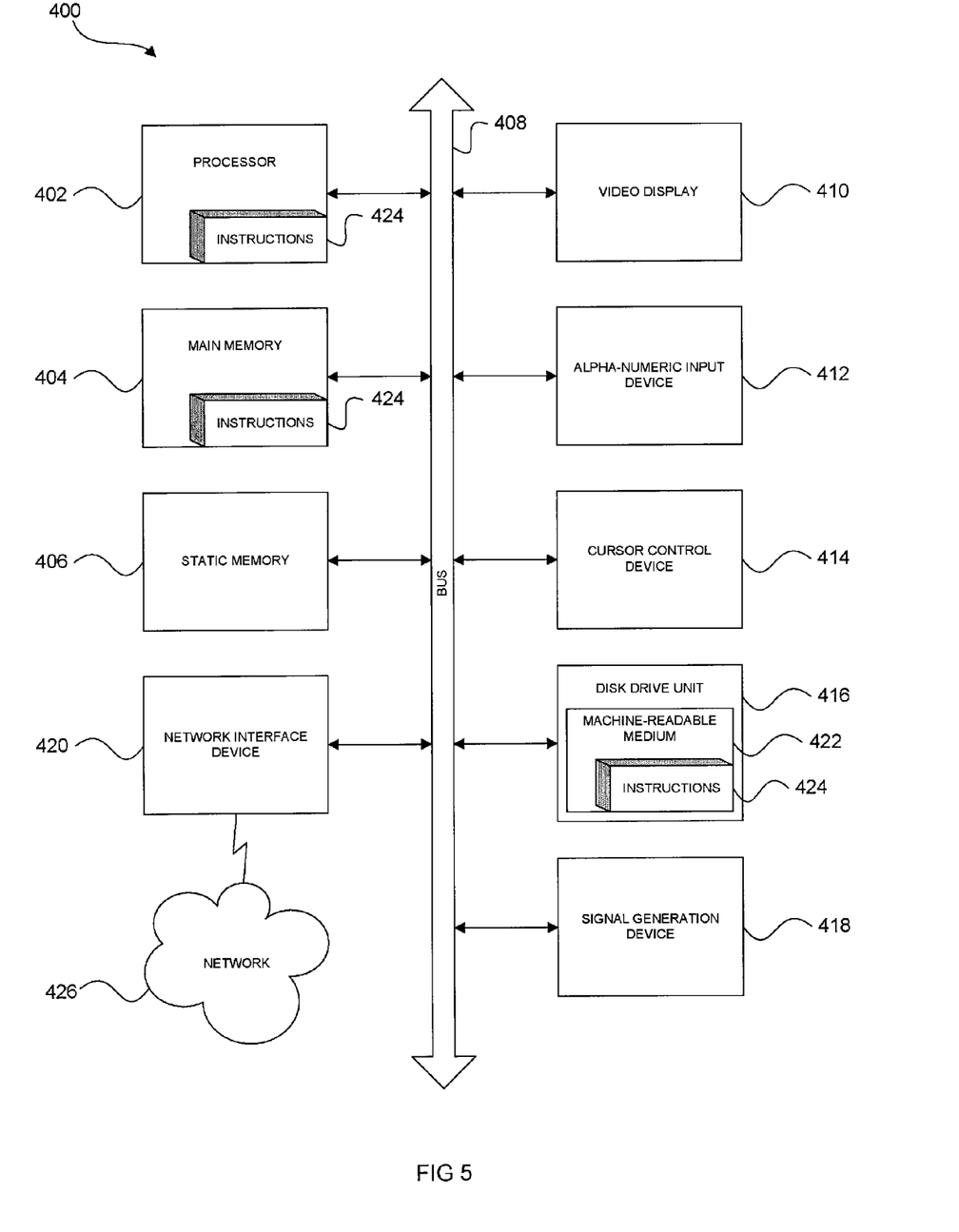
FIG. 5 shows a diagrammatic representation of a machine in the example form of a computer system within which a set of instructions, for causing the machine to perform any one or more of the methodologies discussed herein, may be executed.

FIG. 5 shows a diagrammatic representation of machine in the example form of a computer system 400 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU), a graphics processing unit (GPU) or both), a main memory 404 and a static memory 406, which communicate with each other via a bus 408. The computer system 400 may further include a video display unit 410 (e.g., a liquid crystal display (LCD) or a cathode ray tube (CRT)). The computer system 400 also includes an alphanumeric input device 412 (e.g., a keyboard), a user interface (UI) navigation device 414 (e.g., a mouse), a disk drive unit 416, a signal generation device 418 (e.g., a speaker) and a network interface device 420.

The disk drive unit 416 includes a machine-readable medium 422 on which is stored one or more sets of instructions and data structures (e.g., software 424) embodying or utilized by any one or more of the methodologies or functions described herein. The software 424 may also reside, completely or at least partially, within the main memory 404 and/or within the processor 402 during execution thereof by the computer system 400, the main memory 404 and the processor 402 also constituting machine-readable media.

The software 424 may further be transmitted or received over a network 426 via the network interface device 420 utilizing any one of a number of well-known transfer protocols (e.g., HTTP).

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform anyone or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media.

Although an embodiment of the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The call manager 122 and/or switch 112, or any other computer system or network device in accordance with an example embodiment may be in the form of computer system 400.

The example methods, devices and systems described herein may be used for troubleshooting voice quality issues in a network environment. A network administrator may, based on the generated report, identify which network devices are contributing to a poor quality of service. The network administrator may therefore not need to check the performance of every network device in the network, but rather is provided with a shortlist of network devices which are potentially degrading voice quality.

What is claimed is:

1. A method comprising:
   transmitting a sample voice stream between a source endpoint and a destination endpoint across a voice-stream path which includes at least two network devices in a network;
   comparing a measured quality of the received sample voice stream with pre-defined quality criteria associated with voice quality in the network; and
   if the measured quality fails to meet the pre-defined quality criteria,
   identifying at least one wide area network (WAN) edge router in the voice-stream path by identifying which network devices in the voice-stream path are WAN edge routers;
   obtaining device performance data of the at least one WAN edge router in the voice-stream path, the device performance data comprising at least one of processor utilization, memory utilization, bandwidth oversubscription, buffer over run, or a number of non-error packets that are discarded at the WAN edge router due to buffer over run; and
   generating a network report based on the device performance data, the network report relating the at least one WAN edge router in the voice-stream path to a failure of the measured quality to meet the pre-defined quality criteria associated with voice quality in the network.

2. The method of claim 1, which comprises measuring a quality of the sample voice stream received at the destination endpoint.

3. The method of claim 1, which comprises comparing, at the source endpoint, the quality of the received sample voice stream with the predefined quality criteria.

4. The method of claim 3, which comprises transmitting data indicative of the measured quality of the received sample voice stream from the destination endpoint to the source endpoint.

5. The method of claim 1, which comprises obtaining the device performance data of at least one interface on the WAN edge router.

6. The method of claim 1, in which the device performance data is a buffer over run, the method comprising generating a network report identifying the at least one WAN edge router with a buffer over run as potentially contributing to a degradation of network performance for voice quality in the network.

7. The method of claim 1, which comprises periodically transmitting a sample real-time voice stream across the voice-stream path.

8. The method of claim 1, in which the pre-defined quality criteria are related to the configuration of the network.

9. The method of claim 1, which comprises measuring the quality of the received sample voice stream using a Mean Opinion Score (MOS) estimation algorithm.

10. The method of claim 1, in which the pre-defined quality threshold is based on impairment factors which comprise at least one of a network topology and a Codec type.

11. The method of claim 1, in which obtaining the performance data comprises monitoring a plurality of network devices to obtain performance data prior to transmitting the sample voice stream, the monitoring being limited to layer 3 network devices.

12. The method of claim 1, in which the network is a Voice over Internet Protocol (VoIP) network.

13. The method of claim 1, in which obtaining the performance data comprises periodically determining performance data for a plurality of network devices prior to transmitting the sample voice stream, the performance data being one of the number of Internet protocol packets which have been dropped, memory usage, or central processing unit usage.

14. The method of claim 1, in which identifying the at least one WAN edge router in the voice-stream path comprises performing a real-time transport protocol (RTP) traceroute.

15. The method of claim 1, in which the network is a wide area network.

16. A non-transitory machine-readable storage medium storing a set of instructions which, when executed by a machine, causes the machine to:
   transmit a sample voice stream in a network between a source endpoint and a destination endpoint across a voice-stream path which includes at least two network devices;
   compare a measured quality of the received sample voice stream with pre-defined quality criteria associated with voice quality in the network; and
   if the measured quality fails to meet the pre-defined quality criteria;
   identify at least one wide area network (WAN) edge router in the test data path by identifying which network devices in the test data path are WAN edge routers;
   obtain device performance data of the at least one WAN edge router in the voice-stream path, the device performance data comprising at least one of processor utilization, memory utilization, bandwidth oversubscription, buffer over run, or a number of non-error packets that are discarded at the WAN edge router due to buffer over run; and
   generate a network report based on the device performance data, the network report relating the at least one WAN edge router in the voice-stream path to a failure of the measured quality to meet the pre-defined quality criteria associated with voice quality in the network.

17. An apparatus comprising:
   a transmitter module to transmit a sample voice stream between a source endpoint and a destination endpoint across a voice-stream path which includes at least two network devices in a network;
   a comparing module to compare a measured quality of the received sample voice stream with pre-defined quality criteria associated voice quality in with the network;
   an identification module to identify at least one wide area network (WAN) edge router in the voice-stream path by identifying which network devices in the voice-stream path are WAN edge routers;
   a monitoring module to obtain device performance data of the at least one WAN edge router, the device performance data comprising at least one of processor utilization, memory utilization, bandwidth oversubscription, buffer over run, or a number of non-error packets that are discarded at the WAN edge router due to buffer over run; and
   a reporting module to generate a network report based on the device performance data, the network report being generated if the measured quality fails to meet the pre-defined quality criteria, and the network report relating the at least one WAN edge router in the voice-stream path to a failure of the measured quality to meet the pre-defined quality criteria associated with voice quality in the network.

18. The apparatus of claim 17, which includes a measuring module to measure the quality of the sample voice stream received at the destination endpoint.

19. The apparatus of claim 17, in which the device performance data is associated with at least one interface on the WAN edge router.

20. The apparatus of claim 17, in which the device performance data is a buffer over run, the network report being to identify the at least one WAN edge router with a buffer over run as potentially contributing to a degradation of network performance for voice quality in the network.

21. The apparatus of claim 17, in which the transmitter module is configured to transmit periodically a sample real-time voice stream across the voice-stream path.

22. The apparatus of claim 17, in which the pre-defined quality criteria are related to the configuration of the network.

23. The apparatus of claim 18, in which the measuring module is configured to measure the quality of the received sample voice stream using a Mean Opinion Score (MOS) estimation algorithm.

24. The apparatus of claim 17, in which the pre-defined quality criteria is based on impairment factors which comprise at least one of a network topology and a Codec type.

25. The apparatus of claim 17, wherein the monitoring module is configured to determine performance data of a plurality of network devices prior to transmission of the sample voice stream, determination of the performance data being limited to layer 3 network devices.

26. The apparatus of claim 17, in which the network is a Voice over Internet Protocol (VoIP) network.

27. The apparatus of claim 17, which is configured to determine periodically performance data for a plurality of network devices prior to transmitting the sample voice stream, the performance data being one of the number of Internet protocol packets which have been dropped, memory usage, or central processing unit usage.

28. The apparatus of claim 17, in which the identification module identifies the at least one WAN edge router by a process which includes using a real-time transport protocol (RTP) traceroute.

29. The apparatus of claim 17, in which the network is a wide area network.

30. An apparatus comprising:
   means for transmitting a sample voice stream between a source endpoint and a destination endpoint across a voice-stream path which includes at least two network devices in a network;
   means for comparing a measured quality of the received sample data stream with pre-defined quality criteria associated with voice quality in the network;
   means for identifying at least one wide area network (WAN) edge router in the voice-stream path by identifying which network devices in the voice-stream path are WAN edge routers;
   means for obtaining device performance data of the at least one WAN edge router, the device performance data comprising at least one of processor utilization, memory utilization, bandwidth oversubscription, buffer over run, or a number of non-error packets that are discarded at the WAN edge router due to buffer over run; and
   means for generating a network report based on the device performance data, the network report being generated if the measured quality fails to meet the pre-defined quality criteria, and the network report relating the at least one WAN edge router in the voice-stream path to a failure of the measured quality to meet the pre-defined quality criteria associated with voice quality in the network.

31. The method of claim 1, further comprising:
monitoring a plurality of network devices to obtain corresponding performance data prior to transmitting the sample voice stream;
determining that the measured quality of the received sample voice stream fails to meet the pre-defined quality criteria;
identifying the at least one WAN edge router in the voice-stream path from the monitored network devices; and
obtaining the device performance data of the at least one WAN edge router in the voice-stream path from the performance data obtained prior to transmitting the sample voice stream.

32. The method of claim 1, further comprising:
determining that the measured quality of the received sample voice stream fails to meet the pre-defined quality criteria; and
using the device performance data of the at least one WAN edge router in the voice-stream path to identify a first WAN edge router that is contributing to a poor quality of the received sample voice stream.

33. The method of claim 1, wherein the at least one WAN edge router is between the source endpoint and the destination endpoint in the voice-stream path.

34. The apparatus of claim 17, wherein:
the monitoring module is configured to monitor a plurality of network devices to obtain corresponding performance data prior to transmitting the sample test data stream;
the identification module is configured to identify the at least one WAN edge router in the test data path from the monitored network devices; and
the monitoring module is configured to obtain the device performance data of the at least one WAN edge router in the test data path from the performance data obtained prior to transmitting the sample test data stream.

35. The apparatus of claim 17, wherein the reporting module is configured to use the device performance data of the at least one WAN edge router in the voice-stream path to identify a first WAN edge router that is contributing to a poor quality of the received sample voice stream.

36. The apparatus of claim 17, wherein the at least one WAN edge router is between the source endpoint and the destination endpoint in the voice-stream path.

37. The method of claim 1, further comprising:
monitoring a plurality of network devices to obtain corresponding performance data prior to transmitting the sample voice stream; and
if the measured quality fails to meet the pre-defined quality criteria, using the device performance data obtained prior to transmitting the sample voice stream to identify a first WAN edge router that is in the voice-stream path and that is contributing to a poor quality of the received sample voice stream.

38. The method of claim 1, further comprising:
if the measured quality fails to meet the pre-defined quality criteria, interrogating the at least one WAN edge router in the voice-stream path to obtain the device performance data of the at least one WAN edge router in the voice-stream path.

39. The method of claim 1, wherein each element of the device performance data characterizes device performance for a corresponding WAN edge router in the voice-stream path.

40. The method of claim 1, wherein the device performance data comprises at least one of processor utilization or memory utilization.

* * * * *

UNITED STATES PATENT AND TRADEMARK OFFICE
CERTIFICATE OF CORRECTION

| | | |
|---|---|---|
| PATENT NO. | : 8,630,190 B2 | Page 1 of 1 |
| APPLICATION NO. | : 11/466390 | |
| DATED | : January 14, 2014 | |
| INVENTOR(S) | : Goyal et al. | |

It is certified that error appears in the above-identified patent and that said Letters Patent is hereby corrected as shown below:

In the Claims:

In column 9, line 21, in Claim 16, delete "criteria;" and insert --criteria,--, therefor Signed and Sealed this
Tenth Day of June, 2014

Michelle K. Lee
*Deputy Director of the United States Patent and Trademark Office*